US009904468B2

(12) United States Patent
Liu

(10) Patent No.: US 9,904,468 B2
(45) Date of Patent: Feb. 27, 2018

(54) METHOD AND TERMINAL FOR DETERMINING OPERATION OBJECT

(71) Applicant: HUAWEI TECHNOLOGIES CO., LTD., Shenzhen, Guangdong (CN)

(72) Inventor: Zheng Liu, Nanjing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 409 days.

(21) Appl. No.: 14/594,470

(22) Filed: Jan. 12, 2015

(65) Prior Publication Data
US 2015/0128080 A1 May 7, 2015

Related U.S. Application Data

(63) Continuation of application No. PCT/CN2012/078639, filed on Jul. 13, 2012.

(51) Int. Cl.
G06F 3/0488 (2013.01)

(52) U.S. Cl.
CPC .................. G06F 3/04886 (2013.01)

(58) Field of Classification Search
CPC ...................................... G06F 3/0488
USPC ......................................... 715/768
See application file for complete search history.

(56) References Cited

U.S. PATENT DOCUMENTS 5,568,603 A 10/1996 Chen et al.
6,501,464 B1 12/2002 Cobbley et al.
2004/0104942 A1 6/2004 Weigel
2005/0275633 A1* 12/2005 Varanda .............. G06F 3/0481
345/173
2006/0274944 A1 12/2006 Tanaka et al.
(Continued)

FOREIGN PATENT DOCUMENTS

CN 1505778 6/2004
CN 1877508 12/2006
(Continued)

OTHER PUBLICATIONS

PCT Forms PCT/ISA/210, PCT/ISA/220, and PCT/ISA/237, including International Search Report, dated Apr. 25, 2013 for corresponding International Patent Application No. PCT/CN2013/078639.
(Continued)

Primary Examiner — Kieu D Vu
Assistant Examiner — Darrin Hope
(74) Attorney, Agent, or Firm — Staas & Halsey LLP

(57) ABSTRACT

Embodiments of the present invention provide a method and terminal for operating through a touch screen. The method includes: after a transparent virtual keyboard is displayed, receiving a first operation for a display area of the transparent virtual keyboard through a touch screen; determining, according to the first operation, that a target object of the first operation is a page content in the display area of the transparent virtual keyboard; and performing the first operation for the page content in the display area of the transparent virtual keyboard. Therefore, the operation may be directly performed for the determined target object. Therefore, no additional operation is required to perform switching between the transparent virtual keyboard and the page, thereby reducing user operations and improving the user experience.

16 Claims, 5 Drawing Sheets

(56) References Cited

U.S. PATENT DOCUMENTS

| | | | |
|---|---|---|---|
| 2009/0027334 A1 | 1/2009 | Foulk et al. | |
| 2010/0085313 A1* | 4/2010 | Rider | G06F 3/04886 345/173 |
| 2011/0107212 A1* | 5/2011 | Jeong | G06F 3/0481 715/702 |
| 2011/0258565 A1* | 10/2011 | Arscott | G06F 3/0416 715/763 |
| 2012/0004033 A1* | 1/2012 | Lyons | G06F 3/04886 463/35 |
| 2013/0122962 A1 | 5/2013 | Yue | |

FOREIGN PATENT DOCUMENTS

| | | |
|---|---|---|
| CN | 102043574 | 5/2011 |
| CN | 102177489 | 9/2011 |
| CN | 102439556 | 5/2012 |
| EP | 2 175 355 A1 | 4/2010 |
| EP | 2 402 846 A2 | 1/2012 |

OTHER PUBLICATIONS

Search Report dated Oct. 25, 2013 for corresponding Chinese Patent Application No. 201280001194.6.
Office Action dated Nov. 5, 2013 for corresponding Chinese Patent Application No. 201280001194.6.
Search Report dated Jun. 30, 2014 for corresponding Chinese Patent Application No. 201280001194.6.
Office Action dated Jul. 11, 2014 for corresponding Chinese Patent Application No. 201280001194.6.
International Search Report dated Apr. 25, 2013, in corresponding International Patent Application No. PCT/CN2012/078639.

* cited by examiner

METHOD AND TERMINAL FOR DETERMINING OPERATION OBJECT

CROSS-REFERENCE TO RELATED APPLICATIONS

This application is a continuation of International Application No. PCT/CN2012/078639, filed on Jul. 13, 2012, which is hereby incorporated by reference in its entirety.

FIELD OF THE INVENTION

The present invention relates to the field of mobile communications, and in particular, to a method and terminal for operating through a touch screen.

BACKGROUND OF THE INVENTION

Mobile terminals mainly include: a smart phone, a tablet (for example, Pads such as an iPad, and a Tablet PC), a mobile reading device (such as Amazon Kindle), and so on. The mobile terminals are limited by portability and therefore have a limited screen size. The screen sizes of mainstream mobile Internet devices are as follows: smart phone: 2.4-4 inches; tablet: 7-10 inches; and mobile reading device: 6-8 inches.

Inputting of a mobile terminal in the prior art is mainly performed through a physical keyboard and a virtual keyboard. Due to popularity of the large-sized touch screen and the requirement for decreasing the size of the mobile terminal and increasing portability, more and more mobile terminals display a virtual keyboard on the screen as a main mode of inputting information. The layout of the virtual keyboard on the screen includes a conventional numeric keyboard and a standard conventional keyboard (QWERTY keyboard), and a user may freely switch between the two layout modes. There are many keys on the QWERTY keyboard, and each key is small-sized. There are few keys on the conventional numeric keyboard, and each key is large-sized. Most English inputting adopts the QWERTY layout, while Chinese inputting adopts both the conventional numeric keyboard and the standard conventional keyboard according to user preferences.

When inputting is performed through a virtual keyboard, a mobile terminal is limited by portability and therefore does not have a large-sized touch screen. On the other hand, for ease of user input, the size of the virtual keyboard on the screen cannot be too small. The main weakness of using the virtual keyboard on the screen lies in that when inputting is performed, the virtual keyboard occupies a large screen area, which leads to that the viewable screen area is decreased greatly, and therefore, the display space is insufficient for inputting data through the keyboard on the screen and clearly displaying usable information.

To solve the above problems, the prior art uses the mode of a transparent virtual keyboard, as shown in FIG. 1. The inputting mode of the user is classified into two types according to different operation objects. If the operation object of the user is a virtual keyboard, the inputting mode is called a keyboard mode. If the operation object of the user is a layer below the virtual keyboard, for example, a text input box, the inputting mode is called a non-keyboard mode. The keyboard mode and the non-keyboard mode are implemented by clicking a switch button of the virtual keyboard mode or a hardware button.

By using the above modes, when the transparent virtual keyboard is displayed, if the user needs to frequently perform inputting on the virtual keyboard and operate a page, for example, the user fills a series of registration information, the user needs to switch between the two operations of the virtual keyboard in turn. However, the switching is implemented through a separate button or a status bar icon. As a result, the user needs to additionally click the button many times to switch between the virtual keyboard and the page, resulting in complexity of user interaction.

SUMMARY OF THE INVENTION

A method and terminal for determining an operation object that are provided in embodiments of the present invention can simplify complexity of the switching performed by a user between the virtual keyboard and page inputting.

In a first aspect, the present invention provides a method for operating through a touch screen, including: after a transparent virtual keyboard is displayed, receiving a first operation for a display area of the transparent virtual keyboard through a touch screen; determining, according to the first operation, that a target object of the first operation is a page content in the display area of the transparent virtual keyboard; and performing the first operation for the page content in the display area of the transparent virtual keyboard.

In a first implementation of the first aspect of the present invention, the determining, according to the first operation, that a target object of the first operation is a page content in the display area of the transparent virtual keyboard specifically includes: obtaining positions of touch points of the first operation on the screen, and determining that the positions of all the touch points are located in the display area of the transparent virtual keyboard; and determining that the first operation is valid inputting of the transparent virtual keyboard, and further determining that a duration of touching the touch points is greater than a preset duration value, or determining that the first operation is invalid inputting of the transparent virtual keyboard.

In combination with the first implementation of the first aspect of the present invention, in a first possibility, the determining that the first operation is invalid inputting of the transparent virtual keyboard specifically includes:

determining that a position of any touch point of the first operation is located in a blank space between keys of the transparent virtual keyboard; or determining that the first operation is simultaneously clicking multiple touch points in the display area of the transparent virtual keyboard, where the number of touch points is greater than the maximum number of simultaneously clicked touch points supported by the valid inputting of the transparent virtual keyboard; or determining that the first operation is a track generated through touch points within the display area of the transparent virtual keyboard, where the track is located outside the display area of the transparent virtual keyboard.

In combination with the first aspect, or the first implementation, or the first possibility, in a second possibility, the method further includes: judging that the first operation is an operation of not triggering new inputting through the transparent virtual keyboard, and improving transparency of the transparent virtual keyboard; or judging that the first operation is an operation of triggering new inputting through the transparent virtual keyboard, and continuing to display the transparent virtual keyboard.

In combination with the second possibility of the present invention, in a third possibility, the improving transparency of the transparent virtual keyboard specifically includes: improving the transparency to a preset value for hiding the transparent virtual keyboard.

In combination with the third possibility of the present invention, in a fourth possibility, the method further includes: receiving a second operation for the display area of the transparent virtual keyboard through the touch screen; determining, according to the second operation, that a target object of the second operation is the transparent virtual keyboard; and performing the second operation for the transparent virtual keyboard.

In combination with the fourth possibility of the present invention, in a fifth possibility, the determining, according to the second operation, that a target object of the second operation is the transparent virtual keyboard specifically includes: obtaining positions of touch points of the second operation on the screen, and determining that the positions of all the touch points are located in the display area of the transparent virtual keyboard; and determining that the second operation is valid inputting of the transparent virtual keyboard, and further determining that a duration of touching the touch points is smaller than or equal to the preset duration value.

In combination with the first aspect, the first implementation, and any one of the first to fifth possibilities, in a sixth possibility, before the transparent virtual keyboard is displayed, the method further includes: receiving a third operation whose target object is a page, and determining that the third operation for the page is an operation of triggering inputting through the transparent virtual keyboard; and reducing transparency of the transparent virtual keyboard to display the transparent virtual keyboard.

In combination with the sixth possibility, in a seventh possibility, the reducing transparency of the transparent virtual keyboard specifically includes: reducing the transparency to a preset value for displaying the transparent virtual keyboard.

In combination with the third possibility, the fifth possibility, or the seventh possibility, in an eighth possibility, the method further includes: receiving a request for adjusting the preset value for hiding the transparent virtual keyboard or the preset value for displaying the transparent virtual keyboard or the preset duration value; and according to an input value of the adjusting request, adjusting the preset value for hiding the transparent virtual keyboard or the preset value for displaying the transparent virtual keyboard or the preset duration value.

In a second aspect, the present invention provides a terminal, including: a transparent virtual keyboard displaying module, configured to display a transparent virtual keyboard; a receiving module, configured to receive a first operation for a display area of the transparent virtual keyboard through a touch screen after the transparent virtual keyboard is displayed; a determining module, configured to determine, according to the first operation received by the receiving module, that a target object of the first operation is a page content in the display area of the transparent virtual keyboard; and an operation performing module, configured to perform the first operation received by the receiving module for the page content in the display area of the transparent virtual keyboard after the determining module determines that the target object of the first operation received by the receiving module is the page content in the display area of the transparent virtual keyboard.

In a first implementation of the second aspect of the present invention, the determining module is specifically configured to: according to the first operation received by the receiving module, obtain positions of touch points of the first operation on the screen, and determine that the positions of all the touch points are located in the display area of the transparent virtual keyboard; and determine that the first operation received by the receiving module is valid inputting of the transparent virtual keyboard, and further determine that a duration of touching the touch points is greater than a preset duration value, or determine that the first operation received by the receiving module is invalid inputting of the transparent virtual keyboard.

In combination with the first implementation of the second aspect of the present invention, in a first possibility, the determining, by the determining module, that the first operation received by the receiving module is invalid inputting of the transparent virtual keyboard specifically includes:

determining, by the determining module, that a position of any touch point of the first operation received by the receiving module is located in a blank space between keys of the transparent virtual keyboard; or determining, by the determining module, that the first operation received by the receiving module is simultaneously clicking multiple touch points in the display area of the transparent virtual keyboard, where the number of touch points is greater than the maximum number of simultaneously clicked touch points supported by the valid inputting of the transparent virtual keyboard; or determining, by the determining module, that the first operation received by the receiving module is a track generated through touch points within the display area of the transparent virtual keyboard, where the track is located outside the display area of the transparent virtual keyboard.

In combination with the second aspect, or the first implementation, or the first possibility, in a second possibility, the terminal further includes a judging module, where: the judging module is configured to judge that the first operation received by the receiving module is an operation of not triggering new inputting through the transparent virtual keyboard; and the transparent virtual keyboard displaying module is configured to improve transparency of the transparent virtual keyboard to a preset value for hiding the transparent virtual keyboard after the judging module judges that the first operation is the operation of not triggering new inputting through the transparent virtual keyboard; or the judging module is configured to judge that the first operation received by the receiving module is an operation of triggering new inputting through the transparent virtual keyboard; and the transparent virtual keyboard displaying module is configured to continue to display the transparent virtual keyboard after the judging module judges that the first operation is the operation of triggering new inputting through the transparent virtual keyboard.

In combination with the second possibility of the present invention, in a third possibility, the receiving module is further configured to receive a second operation for the display area of the transparent virtual keyboard through the touch screen; the determining module is further configured to determine, according to the second operation received by the receiving module, that a target object of the second operation is the transparent virtual keyboard; and the operation performing module is configured to perform the second operation received by the receiving module for the transparent virtual keyboard after the determining module determines that the target object of the second operation received by the receiving module is the transparent virtual keyboard.

In combination with the third possibility, in a fourth possibility, the determining, by the determining module according to the second operation received by the receiving module, that a target object of the second operation is the transparent virtual keyboard specifically includes: obtaining positions of touch points of the first operation on the screen according to the first operation received by the receiving module, and determining that the positions of all the touch points are located in the display area of the transparent virtual keyboard; and determining that the second operation is valid inputting of the transparent virtual keyboard, and further determining that a duration of touching the touch points is smaller than or equal to the preset duration value.

In combination with the fourth possibility, in a fifth possibility, before the transparent virtual keyboard displaying module displays the transparent virtual keyboard, the receiving module is further configured to receive a third operation whose target object is a page; the determining module is further configured to determine that the third operation received by the receiving module is an operation of triggering inputting through the transparent virtual keyboard; and the transparent virtual keyboard displaying module is further configured to reduce the transparency to a preset value for displaying the transparent virtual keyboard.

In combination with the first possibility, the third possibility, or the fifth possibility, in a sixth possibility, the terminal further includes an adjusting module, where: the receiving module is further configured to receive a request for adjusting the preset value for hiding the transparent virtual keyboard or the preset value for displaying the transparent virtual keyboard or the preset duration value; and the adjusting module is configured to adjust, according to an input value of the adjusting request received by the receiving module, the preset value for hiding the transparent virtual keyboard or the preset value for displaying the transparent virtual keyboard or the preset duration value.

As seen from the technical solutions provided by the embodiments of the present invention, the target object of the operation is determined according to the operation for the display area of the transparent virtual keyboard, and the operation is performed directly for the determined target object. Therefore, no additional operation is required to perform switching between the transparent virtual keyboard and the page, thereby reducing user operations and improving the user experience.

BRIEF DESCRIPTION OF THE DRAWINGS

To illustrate the technical solutions in the embodiments of the present invention more clearly, the following briefly describes the accompanying drawings required for describing the embodiments. Apparently, the accompanying drawings in the following description merely show some embodiments of the present invention, and persons of ordinary skill in the art can derive other drawings from the accompanying drawings without creative efforts.

DETAILED DESCRIPTION OF THE EMBODIMENTS

The following clearly and completely describes the technical solutions according to the embodiments of the present invention with reference to the accompanying drawings in the embodiments of the present invention. Apparently, the embodiments in the following description are merely a part rather than all of the embodiments of the present invention. All other embodiments obtained by persons of ordinary skill in the art based on the embodiments of the present invention without creative efforts shall fall within the protection scope of the present invention.

Figure 1:
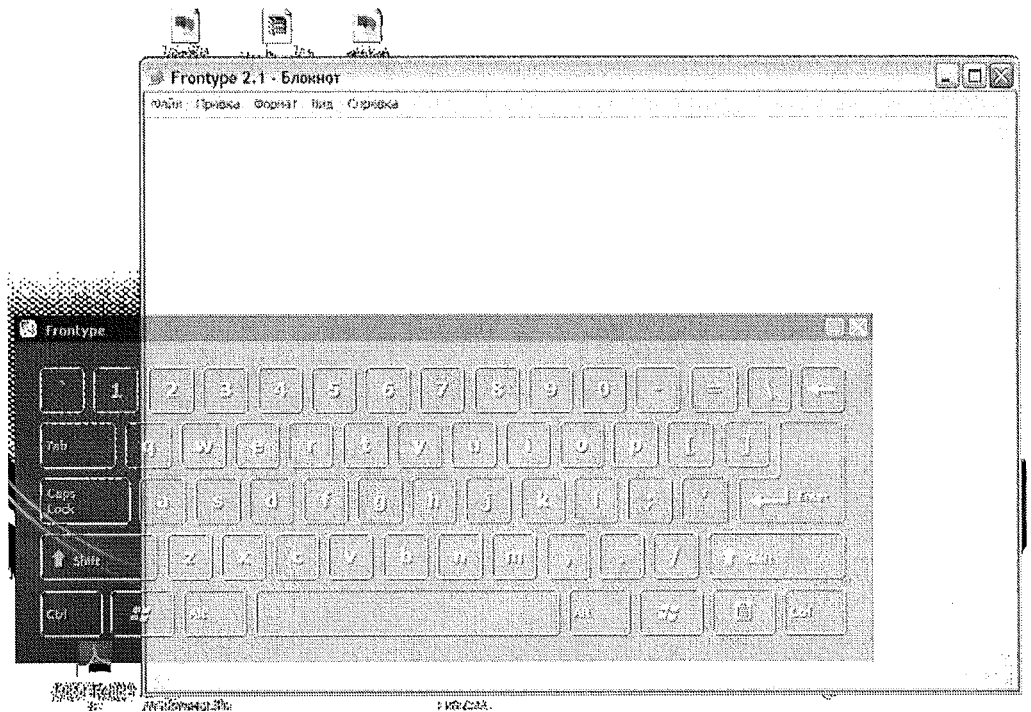
FIG. 1 is a diagram illustrating a display form of a transparent virtual keyboard in the prior art.
Figure 2:
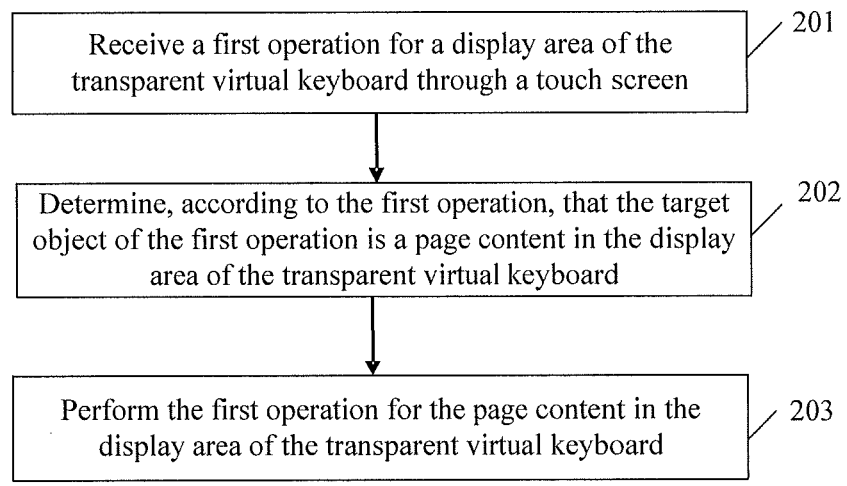
FIG. 2 is a flowchart of a method for operating in a display area of a transparent virtual keyboard according to an embodiment of the present invention.

FIG. 2 is a flowchart of a method for operating in a display area of a transparent virtual keyboard according to an embodiment of the present invention, including the following steps:

Step 201: After a transparent virtual keyboard is displayed, receive a first operation for a display area of the transparent virtual keyboard through a touch screen.

Specifically, the display area of the transparent virtual keyboard is a display area of the transparent virtual keyboard displayed on the screen. Receiving the first operation for the display area of the transparent virtual keyboard is specifically: receiving the operation generated by the user through the display area of the transparent virtual keyboard on the touch screen.

Before performing this step, the terminal further receives a third operation whose target object is a page, and determines that the third operation for the page is an operation of triggering inputting through the transparent virtual keyboard, so that the transparent virtual keyboard in the hidden state is switched to the display state. Specifically, when the terminal determines that the third operation for the page is an operation of triggering inputting through the transparent virtual keyboard, the transparency can be reduced to a preset value for displaying the transparent virtual keyboard so as to display the transparent virtual keyboard.

Step 202: Determine, according to the first operation, that the target object of the first operation is a page content in the display area of the transparent virtual keyboard.

Specifically, the target object of the operation is determined according to the operation generated by the user through the display area of the transparent virtual keyboard on the touch screen. The target object of the operation may be a transparent virtual keyboard or may also be a displayed page. In this embodiment, when the target object of the operation is the page content in the display area of the transparent virtual keyboard, the operation is called a first operation; when the target object of the operation is the transparent virtual keyboard, the operation is called a second operation. Therefore, the operation generated through the display area of the transparent virtual keyboard on the touch screen may be the first operation or may also be the second operation.

In addition, the determining, according to the operation generated by the user through the display area of the transparent virtual keyboard on the touch screen, that the target object of the operation is the page content in the display area of the transparent virtual keyboard specifically includes: obtaining, by the terminal, positions of touch points on the touch screen, and determining that the positions of all the touch points are located in the display area of the transparent virtual keyboard; and determining that the first operation is valid inputting of the transparent virtual keyboard, and further determining that the duration of touching the touch points is greater than a preset duration value, or determining that the first operation is invalid inputting of the transparent virtual keyboard.

Further, the determining, by the terminal, that the first operation is invalid inputting may be: when the first operation is simultaneously clicking multiple touch points, and the number of touch points is greater than the number of simultaneously clicked touch points supported by the transparent virtual keyboard; or determining that the position of any touch point is located in a blank space between keys of the transparent virtual keyboard; or determining that the number of simultaneously clicked touch points in the display area of the transparent virtual keyboard is greater than the maximum number of simultaneously clicked touch points supported by the valid inputting of the transparent virtual keyboard; or determining that the track generated through touch points within the display area of the transparent virtual keyboard is located outside the display area of the transparent virtual keyboard.

Step 203: Perform the first operation for the page content in the display area of the transparent virtual keyboard.

Specifically, when the determined target object is a page, the operation generated by the user through the display area of the transparent virtual keyboard on the touch screen is performed directly for the page, for example, locating a text box of the page, selecting the content of the display area of the transparent virtual keyboard, closing the content of the display area of the transparent virtual keyboard, and magnifying the content of the display area of the transparent virtual keyboard.

When the determined target object is a transparent virtual keyboard, the operation generated by the user through the display area of the transparent virtual keyboard on the touch screen is performed directly for the transparent virtual keyboard, for example, directly operating the keys on the keyboard, or switching the inputting mode of the keyboard.

As seen from the technical solution provided by the embodiment of the present invention, after the transparent virtual keyboard is displayed, an operation is performed through the display area of the transparent virtual keyboard and the operation (for example, locating the text box of the page) is performed for the page content in the display area of the transparent virtual keyboard, without closing the transparent virtual keyboard before performing related operations for the page. Therefore, user operations are reduced and the user experience is improved.

Figure 3:
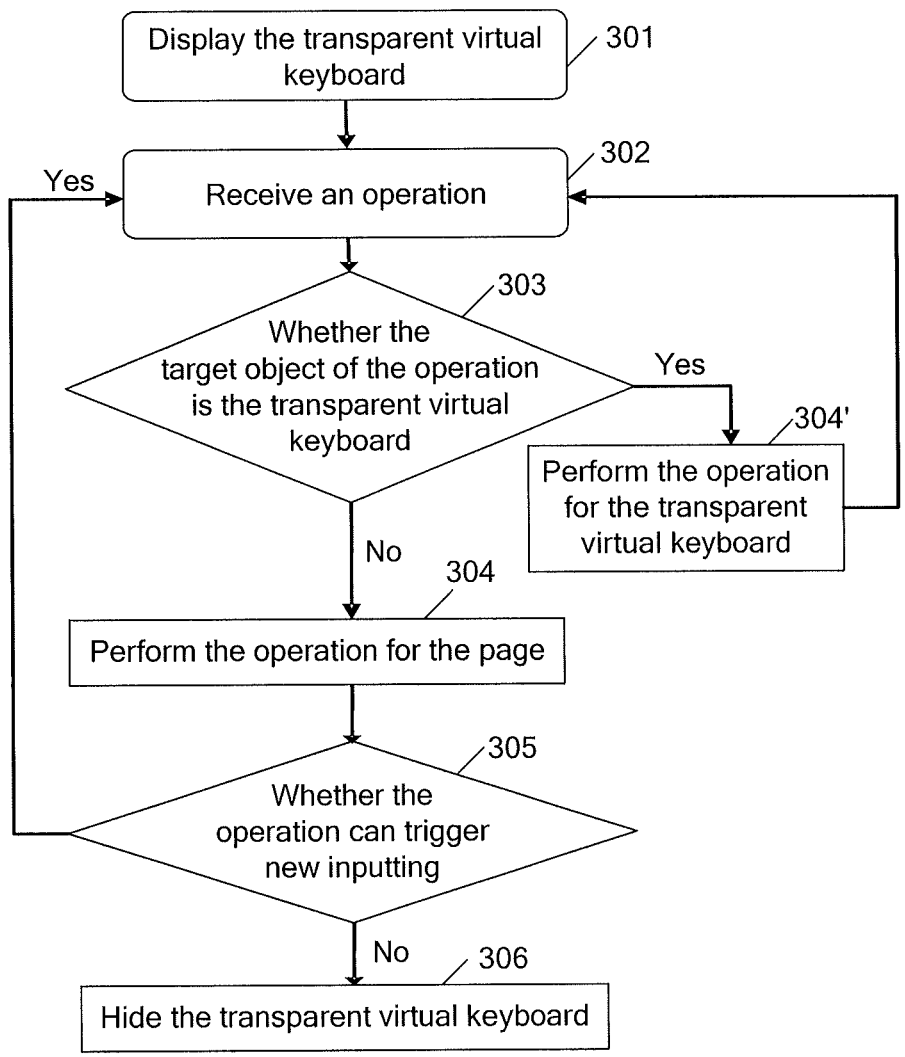
FIG. 3 is a flowchart of another method for operating in a display area of a transparent virtual keyboard according to an embodiment of the present invention.

FIG. 3 is a flowchart of another method for operating in a display area of a transparent virtual keyboard according to an embodiment of the present invention, including the following steps:

Step 301: Receive an operation whose target object is a page, and reduce transparency of the transparent virtual keyboard to display the transparent virtual keyboard.

Specifically, the terminal determines that the operation of the user for the page may trigger inputting through the transparent virtual keyboard, for example, when the user uses a mobile terminal and needs to input information (the user may browse a Web page, or an application program or others), the user clicks, through the touch screen, an area that may trigger inputting, for example, a text box of the page and an address bar, so as to indicate that the user needs to input information through the transparent virtual keyboard, and therefore the transparent virtual keyboard is displayed.

In the embodiment of the present invention, the transparent virtual keyboard is a virtual keyboard displayed or hidden by adjusting transparency of the virtual keyboard. The transparent virtual keyboard does not require a separate operation of opening or closing the virtual keyboard, and is displayed or hidden only by adjusting transparency of the transparent virtual keyboard. Specifically, the terminal stores the preset value for displaying the transparent virtual keyboard. When the terminal determines that the operation whose target object is a page may trigger inputting through the transparent virtual keyboard, transparency of the transparent virtual keyboard is reduced to the preset value for displaying the transparent virtual keyboard.

Further, the user may perform operations to change the preset value for displaying the transparent virtual keyboard, for example, the user may change the preset value through a menu or in other modes, so as to satisfy visual requirements of the user and improve the user experience.

Step 302: After the transparent virtual keyboard is displayed, receive an operation of the user for the display area of the transparent virtual keyboard through the touch screen.

Specifically, the operation may be clicking a single or multiple (at least two touch points) touch points on the screen. The click may be a single click or multiple clicks (more than two clicks).

In addition, the operation may be a track generated by the user through the touch screen, and the track may be a signal track or multiple tracks. The multiple tracks herein may be two tracks or more than two tracks.

Step 303: The mobile terminal judges, according to the operation generated by the user through the touch screen, whether the target object of the current operation is the transparent virtual keyboard.

Specifically, the mobile terminal may judge whether the target object of the operation generated by the user through the touch screen is a transparent virtual keyboard with reference to the method in FIG. 4, as detailed below:

Step 401: The terminal determines whether all touch points are within the display area of the transparent virtual keyboard, and if so, performs step 402, or otherwise, performs step 304.

Specifically, the terminal obtains positions of the touch points, and according to the positions of the touch points, determines whether the touch points are located in the display area of the transparent virtual keyboard. When any touch point is located outside the display area of the transparent virtual keyboard, step 304 is performed. In addition, the determining, by the terminal, the positions of the touch points generated through the touch screen is based on the prior art, and is not limited herein by the embodiment of the present invention.

Step 402: The terminal determines whether the operation generated at the touch points in the display area of the transparent virtual keyboard is valid inputting of the transparent virtual keyboard, and if so, performs step 403, or otherwise, performs step 304.

The inputting of the user through the transparent virtual keyboard may be an operation for a single touch point, or an operation for multiple touch points. The operation for a single touch point may be clicking a single touch point, double-clicking a same touch point, sliding a single touch point to generate a track, and so on; the operation for multiple touch points may be clicking multiple touch points, double-clicking multiple touch points, generating multiple tracks through the multiple touch points, a Pitch-to-Zoom operation generated through multiple touch points, and so on. Specifically, for the inputting of the user through the transparent virtual keyboard, reference may be made to the inputting through the virtual keyboard in the prior art and the inputting through the physical keyboard in the prior art. The inputting is not limited herein by the embodiment of the present invention.

Functions of the keyboard (including the transparent virtual keyboard, and the virtual keyboard and physical keyboard in the prior art) are accepting the input of the user, and performing corresponding operations according to the input of the user and feeding back the operations to the operating system. For example, if the user clicks a key (which may be a key of the physical keyboard or a key of the virtual keyboard), the keyboard outputs, according to the clicked key, the corresponding character or function (if a function key is clicked, for example, Page Up/Down) to the operating system. If the inputting of the user can cause the keyboard to make corresponding operation feedback, the inputting of the user is valid inputting.

The valid inputting of the transparent virtual keyboard is that a valid operation of the transparent virtual keyboard can be triggered when the user touches the transparent virtual keyboard, for example, inputting an uppercase character or a preset paragraph of common strings, or executing a function. Different transparent virtual keyboards may make different judgments about whether the specific inputting of the user is valid inputting, for example:

(1) For the operation of clicking a single touch point (including single-clicking and multi-clicking): According to the position clicked on the transparent virtual keyboard, the terminal uses the character or function of the virtual key closest to the clicked position as the input of the user, or makes the corresponding function feedback to the transparent virtual keyboard (for example, switching the numeric keyboard). Therefore, clicking the display area of the transparent virtual keyboard is valid inputting.

Figure 5:
FIG. 5 and FIG. 6 are schematic diagrams in which inputting of a virtual keyboard is an invalid operation according to an embodiment of the present invention.

Further, it is assumed that the terminal cannot make function feedback to the transparent virtual keyboard when the user clicks the blank area between two virtual keys, but makes function feedback only when the user clicks a virtual key area. When receiving the operation of clicking the transparent virtual keyboard performed by the user, the terminal further needs to judge whether the position clicked by the user belongs to the display area of a key of the transparent virtual keyboard, and if the position clicked by the user belongs to the display area of a key of the transparent virtual keyboard, the inputting of the user is valid inputting. If the position clicked by the user belongs to a blank area between two keys (as shown in FIG. 5, the position clicked by the user belongs to the blank area near the M key), function feedback cannot be made to the transparent virtual keyboard, and therefore, the inputting of the user is not valid inputting.

(2) For the operation of clicking multiple touch points (including single-clicking and multi-clicking): The terminal first judges whether the number of touch points simultaneously clicked by the user in the display area of the transparent virtual keyboard is smaller than or equal to the maximum number of simultaneously clicked touch points supported by the valid inputting of the transparent virtual keyboard, and if so, the inputting of the user is valid inputting, or otherwise, the inputting of the user is invalid inputting.

Figure 6:

Further, as described in the first point, it is assumed that the terminal cannot make function feedback to the transparent virtual keyboard when the user clicks the blank area between two virtual keys, but makes function feedback only when the user clicks a virtual key area. Therefore, when any position clicked by the user belongs to a blank area between two keys (as shown in FIG. 6, when the user clicks two touch points, a clicked position belongs to the blank area near the Z key), function feedback cannot be made to the transparent virtual keyboard, and hence, the inputting of the user is not valid inputting.

(3) Sliding operation generating a track through touch points (a single or multiple touch points): The terminal firstly judges whether the track generated by touching the touch points in the display area of the transparent virtual keyboard is located in the display area of the transparent virtual keyboard, and if any generated track is located outside the display area of the transparent virtual keyboard, the inputting of the user is invalid inputting. Secondly, if the user generates multiple tracks by touching multiple touch points, the terminal may further judge whether sliding the multiple touch points of the transparent virtual keyboard is supported, and if so, the inputting of the user is determined as valid inputting, or otherwise, is determined as invalid inputting.

It should be noted that the judging, by the terminal, whether the operation of the user for the display area of the transparent virtual keyboard is valid inputting means judging whether the operation is valid inputting supported by the transparent virtual keyboard. However, the specific judging method of the terminal may be making different judgments according to the valid inputting supported by preset different transparent virtual keyboards. For different transparent virtual keyboards, an application program corresponding to a transparent virtual keyboard may also be installed on the terminal, and the judgment is made by the application program. Whether the judgment of the valid inputting is made by the operating system or application program of the terminal or the transparent virtual keyboard itself is not limited herein by the embodiment of the present invention.

Step 403: The terminal determines whether the duration of touching touch points by the user is greater than the preset value, and if so, performs step 304, or otherwise, performs step 304'.

Specifically, the terminal stores the preset value of the touching duration for operating the page in the display area of the transparent virtual keyboard. When the user performs an operation in the display area of the transparent virtual keyboard, the user obtains the duration of touching touch points, and if the duration of touching touch points is greater than the preset value, step 304 is performed, or otherwise, step 304' is performed. Further, the user may perform operations to change the preset value of the touching duration, for example, the user may change the preset value through a menu or in other modes, so as to satisfy the individual operation habit and requirements of the user and improve the user experience.

Step 304: When the target object of the operation is a page, perform the above operation for the page, for example, displaying the page content, closing a display area on the page, selecting a content on the page, magnifying the page content, moving the display position of the page, or locating a new inputting area, which is not limited herein by the embodiment of the present invention.

Step 304': When the target object of the operation is the transparent virtual keyboard, perform the above operation for the transparent virtual keyboard, for example, inputting a character or string through the transparent virtual keyboard, or changing the inputting mode of the transparent virtual keyboard, which is not limited herein by the embodiment of the present invention.

Step 305: When the target object of the operation is determined as a page, the terminal further judges whether the operation can trigger new inputting through the transparent virtual keyboard, and if so, the terminal continues to perform step 302, or otherwise, step 302 is performed.

Step 306: Improve transparency of the transparent virtual keyboard.

Specifically, the terminal stores the preset value for hiding the transparent virtual keyboard. When the terminal judges that the operation cannot trigger new inputting through the transparent virtual keyboard, the terminal improves the transparency of the transparent virtual keyboard to a preset value for hiding the transparent virtual keyboard, so as to satisfy visual requirements of the user and improve the user experience.

The triggering, by the operation, new inputting through the transparent virtual keyboard specifically means that the operation indication further requires the user to continue to perform operations through the transparent virtual keyboard. For example, if the operation is that the user selects a new text box on the page through the transparent virtual keyboard, the terminal further requires the user to continue to perform operations through the transparent virtual keyboard. Specifically, the operation may be any operation in step 301.

Figure 4:
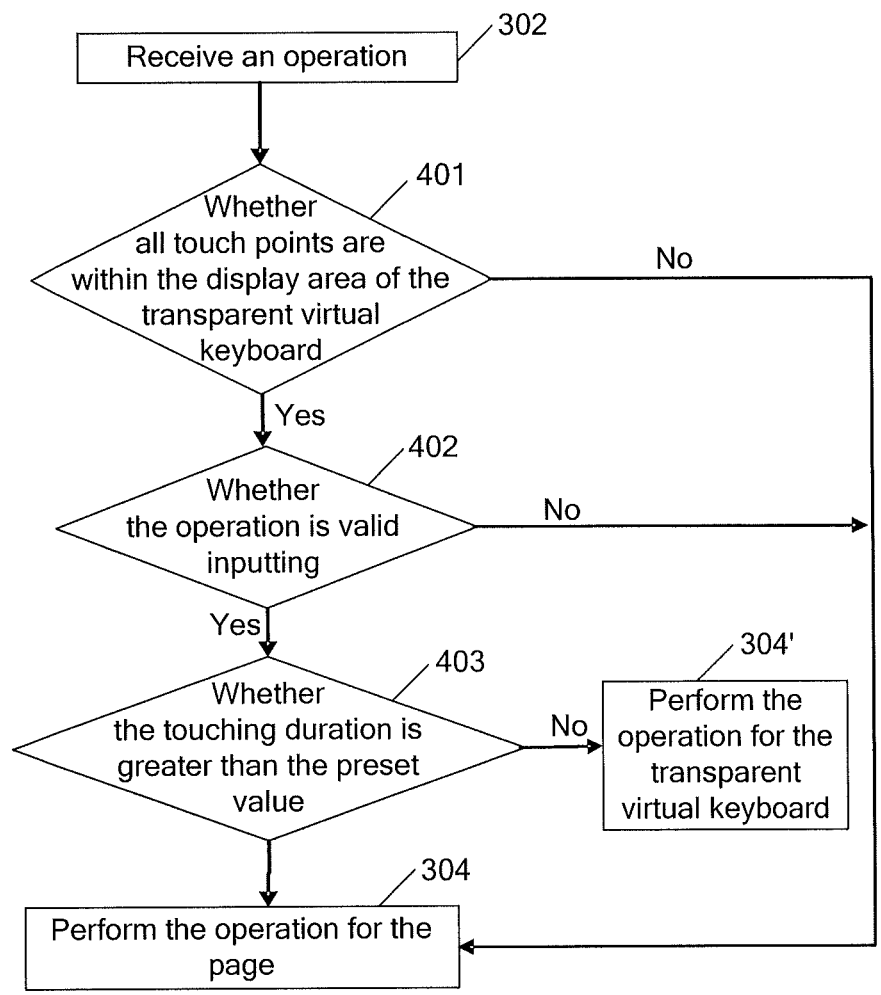
FIG. 4 is a flowchart in which a mobile terminal judges whether a target object of an operation generated by a user through a touch screen is a transparent virtual keyboard according to an embodiment of the present invention.

In addition, in the embodiment of FIG. 2, FIG. 3, or FIG. 4, the terminal may receive at any time a request for adjusting the preset value for hiding the transparent virtual keyboard or the preset value for displaying the transparent virtual keyboard or the preset duration value; and according to an input value of the adjusting request, adjust the preset value for hiding the transparent virtual keyboard or the preset value for displaying the transparent virtual keyboard or the preset duration value.

Specifically, when the terminal receives a request for adjusting the preset value for hiding the transparent virtual keyboard, the terminal adjusts the preset value for hiding the transparent virtual keyboard according to the input value in the request for adjusting the preset value for hiding the transparent virtual keyboard, that is, the preset value for hiding the transparent virtual keyboard is changed to the input value; or when the terminal receives a request for adjusting the preset value for displaying the transparent virtual keyboard, the terminal adjusts the preset value for displaying the transparent virtual keyboard according to the input value in the request for adjusting the preset value for displaying the transparent virtual keyboard, that is, the preset value for displaying the transparent virtual keyboard is changed to the input value; or when the terminal receives a request for adjusting the preset duration value, the terminal adjusts the preset duration value according to the input value in the request for adjusting the preset duration value, that is, the preset duration value is changed to the input value.

As seen from the technical solution provided by the embodiment of the present invention, after the transparent virtual keyboard is displayed, an operation is performed through the display area of the transparent virtual keyboard and the operation (for example, locating the text box of the page) is performed for the page content in the display area of the transparent virtual keyboard, without closing the transparent virtual keyboard before performing related operations for the page. Therefore, user operations are reduced and the user experience is improved.

Figure 7:
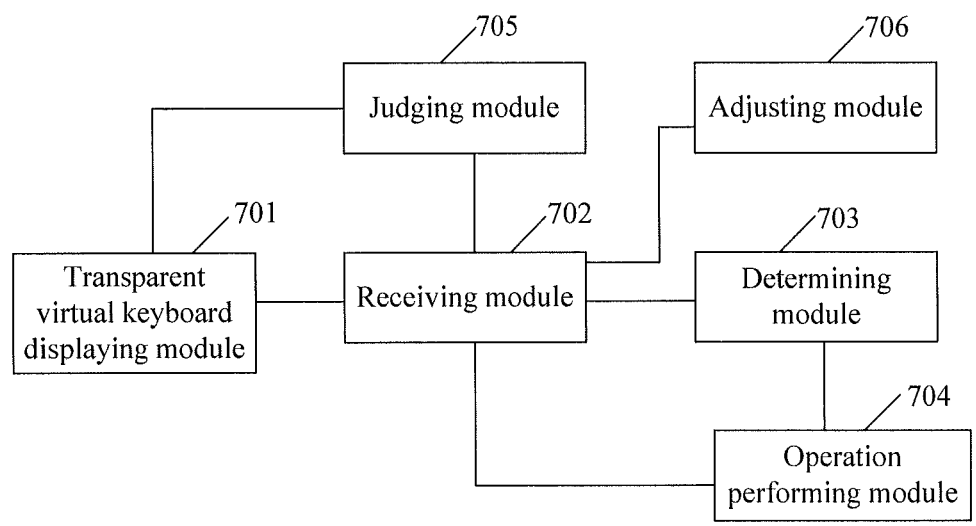
FIG. 7 is a schematic structural diagram of a terminal according to an embodiment of the present invention.

FIG. 7 is a schematic structural diagram of a terminal according to an embodiment of the present invention, including: a transparent virtual keyboard displaying module 701, a receiving module 702, a determining module 703, an operation performing module 704, a judging module 705, and an adjusting module 706.

The transparent virtual keyboard displaying module 701 is configured to display a transparent virtual keyboard; the receiving module 702 is configured to receive a first operation for a display area of the transparent virtual keyboard through a touch screen after the transparent virtual keyboard is displayed; the determining module 703 is configured to determine, according to the first operation received by the receiving module, that the target object of the first operation is a page content in the display area of the transparent virtual keyboard; and the operation performing module 704 is configured to perform the first operation received by the receiving module for the page content in the display area of the transparent virtual keyboard after the determining module determines that the target object of the first operation received by the receiving module is the page content in the display area of the transparent virtual keyboard.

Further, the determining module 703 is specifically configured to: according to the first operation received by the receiving module, obtain positions of touch points of the first operation on the screen, and determine that the positions of all the touch points are located in the display area of the transparent virtual keyboard; and determine that the first operation received by the receiving module is valid inputting of the transparent virtual keyboard, and further determine that the duration of touching the touch points is greater than a preset duration value, or determine that the first operation received by the receiving module is invalid inputting of the transparent virtual keyboard.

Specifically, the determining, by the determining module 703, that the first operation received by the receiving module 702 is invalid inputting of the transparent virtual keyboard includes the following: The determining module 703 determines that the position of any touch point of the first operation received by the receiving module 702 is located in a blank space between keys of the transparent virtual keyboard; or the determining module 703 determines that the first operation received by the receiving module 702 is simultaneously clicking multiple touch points in the display area of the transparent virtual keyboard, where the number of touch points is greater than the maximum number of simultaneously clicked touch points supported by the valid inputting of the transparent virtual keyboard; or the determining module 703 determines that the first operation received by the receiving module 702 is a track generated through touch points within the display area of the transparent virtual keyboard, where the track is located outside the display area of the transparent virtual keyboard.

It should be noted that, for the determining, by the determining module 703, that the first operation received by the receiving module is invalid inputting of the transparent virtual keyboard, reference may be made to the description in step 402 in FIG. 4. No detailed description is provided herein by the embodiment of the present invention.

Further, the judging module 705 is configured to judge that the first operation received by the receiving module 702 is an operation of not triggering new inputting through the transparent virtual keyboard; and the transparent virtual keyboard displaying module 701 is configured to improve transparency of the transparent virtual keyboard to a preset value for hiding the transparent virtual keyboard after the judging module judges that the first operation is the operation of not triggering new inputting through the transparent virtual keyboard; or the judging module 705 is configured to judge that the first operation received by the receiving module 702 is an operation of triggering new inputting through the transparent virtual keyboard; and the transparent virtual keyboard displaying module 701 is configured to continue to display the transparent virtual keyboard after the judging module 705 judges that the first operation is the operation of triggering new inputting through the transparent virtual keyboard.

It should be noted that, for the judging, by the judging module 705, whether the first operation is an operation of triggering new inputting through the transparent virtual keyboard, reference may be made to the related description in step 301 in FIG. 3. No detailed description is provided herein by the embodiment of the present invention. In addition, for the adjusting of the transparency by the transparent virtual keyboard displaying module 701, reference may be made to the explanation about step 301.

Further, the receiving module 702 is further configured to receive a second operation for the display area of the transparent virtual keyboard through the touch screen; the determining module 703 is further configured to determine, according to the second operation received by the receiving module, that the target object of the second operation is the transparent virtual keyboard; and the operation performing module 704 is further configured to perform the second operation received by the receiving module for the transparent virtual keyboard after the determining module determines that the target object of the second operation received by the receiving module is the transparent virtual keyboard.

It should be noted that the first operation and the second operation may be performed in any time sequence. After the transparent virtual keyboard is displayed, for the operation for the transparent virtual keyboard or page by touching the display area of the transparent virtual keyboard, reference may be made to the description in step 202 or step 303, and no detailed description is provided herein by the embodiment of the present invention.

Further, the determining, by the determining module 703 according to the second operation received by the receiving module 702, that the target object of the second operation is the transparent virtual keyboard specifically includes: obtaining positions of touch points of the first operation on the screen according to the first operation received by the receiving module 702, and determining that the positions of all the touch points are located in the display area of the transparent virtual keyboard; and determining that the second operation is valid inputting of the transparent virtual keyboard, and further determining that the duration of touching the touch points is smaller than or equal to the preset duration value. For details, reference may be made to the description in step 202 and step 302 and step 403, and no detailed description is provided herein by the embodiment of the present invention.

Further, before the transparent virtual keyboard displaying module 701 displays the transparent virtual keyboard, the receiving module 702 is further configured to receive a third operation whose target object is a page; the determining module 703 is further configured to determine that the third operation received by the receiving module is an operation of triggering inputting through the transparent virtual keyboard; and the transparent virtual keyboard displaying module 701 is further configured to reduce the transparency to a preset value for displaying the transparent virtual keyboard.

For details, reference may be made to the description of step 301, and no detailed description is provided herein by the embodiment of the present invention.

Further, the terminal in the above embodiment further includes an adjusting module 706; the receiving module 702 is further configured to receive a request for adjusting the preset value for hiding the transparent virtual keyboard or the preset value for displaying the transparent virtual keyboard or the preset duration value; and the adjusting module 706 is configured to adjust, according to an input value of the adjusting request received by the receiving module 702, the preset value for hiding the transparent virtual keyboard or the preset value for displaying the transparent virtual keyboard or the preset duration value.

Specifically, when the receiving module 702 receives a request for adjusting the preset value for hiding the transparent virtual keyboard, the adjusting module 706 adjusts the preset value for hiding the transparent virtual keyboard according to the input value in the request for adjusting the preset value for hiding the transparent virtual keyboard, that is, the preset value for hiding the transparent virtual keyboard is changed to the input value; or when the receiving module 702 receives a request for adjusting the preset value for displaying the transparent virtual keyboard, the adjusting module 706 adjusts the preset value for displaying the transparent virtual keyboard according to the input value in the request for adjusting the preset value for displaying the transparent virtual keyboard, that is, the preset value for displaying the transparent virtual keyboard is changed to the input value; or when the receiving module 702 receives a request for adjusting the preset duration value, the adjusting module 706 adjusts the preset duration value according to the input value in the request for adjusting the preset duration value, that is, the preset duration value is changed to the input value.

As seen from the technical solution provided by the embodiment of the present invention, after the transparent virtual keyboard is displayed, an operation is performed through the display area of the transparent virtual keyboard and the operation (for example, locating the text box of the page) is performed for the page content in the display area of the transparent virtual keyboard, without closing the transparent virtual keyboard before performing related operations for the page. Therefore, user operations are reduced and the user experience is improved.

Figure 8:
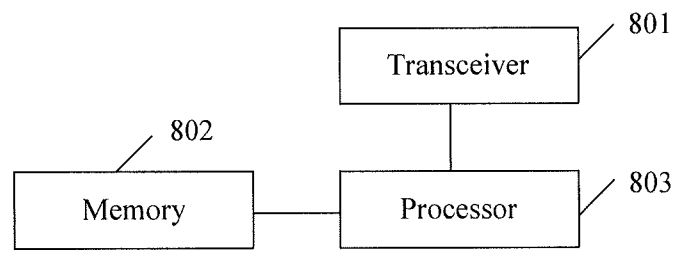
FIG. 8 is a schematic structural diagram of another terminal according to an embodiment of the present invention.

FIG. 8 is a schematic structural diagram of a terminal according to an embodiment of the present invention, including: a transceiver 801, a memory 802, and a processor 803.

Specifically, the transceiver 801 is configured to communicate with the outside, and receive an instruction sent to the terminal and send signaling. The memory 802 is coupled with the processor 803; the memory 802 is configured to store various programs and applications and execute functions of various programs and applications when invoked by the processor 803. Specifically, the transceiver in the embodiment of the present invention is configured to receive a first operation, a second operation, and a third operation for a display area of a transparent virtual keyboard through a touch screen. The processor 803 is configured to determine, according to the first operation, that the target object of the first operation is a page content of the display area of the transparent virtual keyboard, and perform the first operation for the page content of the display area of the transparent virtual keyboard.

In addition, the processor 803 may be configured to perform each step described in FIG. 2 and FIG. 3 in the method embodiments. No detailed description is provided herein by the embodiment of the present invention.

In the above embodiments, the terminal may be various mobile terminals, for example, various smart phones, tablets, and mobile reading devices. In the above module embodiment, and especially the embodiment corresponding to FIG. 7, the terminal is divided into modules by function logic, but the above division is not limited by the present invention, so long as corresponding functions can be implemented. In addition, the specific names of the functional modules are only used for differentiation and not intended to limit the protection scope of the present invention. All the methods implemented in FIG. 2 and FIG. 3 and functions of functional modules of the terminal in FIG. 7 can be completed by the processor of the terminal by running various modules.

In addition, the terminals in FIG. 7 and FIG. 8 may perform any step performed by the terminal in the above method embodiments, and no detailed description is provided herein by the present invention.

The foregoing descriptions are merely exemplary embodiments of the present invention, but not intended to limit the protection scope of the present invention. Any variation or replacement that can be easily made by persons skilled in the art without departing from the technical scope disclosed by the present invention shall fall within the protection scope of the present invention. Therefore, the protection scope of the present invention shall be subject to the appended claims.

What is claimed is:

1. A method for operating through a touch screen of a mobile terminal, comprising:
   displaying a transparent virtual keyboard in a display area on the touch screen;
   receiving a first touch operation for the display area of the transparent virtual keyboard through the touch screen;
   determining, according to the first touch operation, that a target object of the first touch operation is a page content in the display area of the transparent virtual keyboard;
   performing the first touch operation for the page content in the display area of the transparent virtual keyboard;
   receiving a second touch operation for the display area of the transparent virtual keyboard through the touch screen;
   determining, according to the second touch operation, that a target object of the second touch operation is the transparent virtual keyboard; and
   performing the second touch operation for the transparent virtual keyboard;
   wherein the determining, according to the first touch operation, that the target object of the first touch operation is the page content in the display area of the transparent virtual keyboard comprises:
     obtaining positions of touch points of the first touch operation on the touch screen,
     determining that the positions of the touch points on the touch screen are located in the display area of the transparent virtual keyboard,
     determining whether the first touch operation is valid inputting of the transparent virtual keyboard by determining that a valid operation of the transparent virtual keyboard is triggered when the user touches the transparent virtual keyboard,
     determining whether a first duration of touching the touch points is greater than a preset duration value, and
     determining that the first touch operation is valid inputting of the transparent virtual keyboard or determining that the first touch operation is invalid inputting of the transparent virtual keyboard based on the first duration determination; and
   wherein the determining, according to the second touch operation, that the target object of the second touch operation is the transparent virtual keyboard comprises:
     obtaining positions of touch points of the second touch operation on the touch screen,
     determining that the positions of the touch points are located in the display area of the transparent virtual keyboard,
     determining whether the second touch operation is valid inputting of the transparent virtual keyboard by determining that the valid operation of the transparent virtual keyboard is triggered when the user touches the transparent virtual keyboard,
     determining whether a second duration of touching the touch points is smaller than or equal to the preset duration value, and
     determining that the second touch operation is valid inputting of the transparent virtual keyboard or invalid inputting of the transparent virtual keyboard based on the second duration determination.

2. The method according to claim 1, wherein the determining that the first touch operation is invalid inputting of the transparent virtual keyboard further comprises:
   determining that any position of any touch point of the first touch operation is located in a blank space between keys of the transparent virtual keyboard.

3. The method according to claim 1, wherein the determining that the first touch operation is invalid inputting of the transparent virtual keyboard further comprises:
   determining that the first touch operation is simultaneously clicking multiple touch points in the display area of the transparent virtual keyboard, wherein the number of touch points is greater than the maximum number of simultaneously clicked touch points supported by the valid inputting of the transparent virtual keyboard.

4. The method according to claim 1, wherein the determining that the first touch operation is invalid inputting of the transparent virtual keyboard further comprises:
   determining that the first touch operation is a track generated through touch points within the display area of the transparent virtual keyboard, wherein the track is located outside the display area of the transparent virtual keyboard.

5. The method according to claim 1, further comprising:
   based upon the determining that the target object of the first touch operation is the page content in the display area of the transparent virtual keyboard, increasing transparency of the transparent virtual keyboard.

6. The method according to claim 5, wherein the increasing transparency of the transparent virtual keyboard comprises:
   improving the transparency to a preset value for hiding the transparent virtual keyboard.

7. The method according to claim 1, before the displaying the transparent virtual keyboard on the touch screen, the method further comprises:
   receiving a third operation whose target object is a page, and determining that the third operation for the page is an operation of triggering inputting through the transparent virtual keyboard; and
   reducing transparency of the transparent virtual keyboard to display the transparent virtual keyboard.

8. The method according to claim 7, the reducing transparency of the transparent virtual keyboard comprises: reducing the transparency to a preset value for displaying the transparent virtual keyboard.

9. The method according to claim 1, further comprising: receiving at any time a request for adjusting the preset duration value.

10. A mobile terminal, comprising:
a touch screen;
a memory configured to store instructions; and
a processor configured to execute the instructions to:
   display a transparent virtual keyboard in a display area on the touch screen;
   receive a first touch operation for the display area of the transparent virtual keyboard through the touch screen;
   determine, according to the first touch operation, that a target object of the first touch operation is a page content in the display area of the transparent virtual keyboard;
   perform the first touch operation for the page content in the display area of the transparent virtual keyboard;
   receive a second touch operation for the display area of the transparent virtual keyboard through the touch screen;
   determine according to the second touch operation, that a target object of the second touch operation is the transparent virtual keyboard; and
   perform the second touch operation for the transparent virtual keyboard;
wherein the determination, according to the first touch operation, that a target object of the first touch operation is a page content in the display area of the transparent virtual keyboard comprises:
   obtaining positions of touch points of the first touch operation on the screen,
   determining that the positions of the touch points on the touch screen are located in the display area of the transparent virtual keyboard,
   determining whether the first touch operation is valid inputting of the transparent virtual keyboard by determining that a valid operation of the transparent virtual keyboard is triggered when the user touches the transparent virtual keyboard,
   determining whether a first duration of touching the touch points is greater than a preset duration value, and
   determining that the first touch operation is valid inputting of the transparent virtual keyboard or determining that the first touch operation is invalid inputting of the transparent virtual keyboard based on the first duration determination; and
wherein the determining, according to the second touch operation, that a target object of the second touch operation is the transparent virtual keyboard comprises:
   obtaining positions of touch points of the second touch operation on the screen,
   determining that the positions of the touch points are located in the display area of the transparent virtual keyboard,
   determining whether the second touch operation is valid inputting of the transparent virtual keyboard by
   determining that a valid operation of the transparent virtual keyboard is triggered when the user touches the transparent virtual keyboard,
   determining whether a second duration of touching the touch points is smaller than or equal to the preset duration value, and
   determining that the second touch operation is valid inputting of the transparent virtual keyboard or invalid inputting of the transparent virtual keyboard based on the second duration determination.

11. The mobile terminal according to claim 10, wherein the determining that the first touch operation is invalid inputting of the transparent virtual keyboard executed by the processor further comprises:
   determining that the position of a touch point of the first touch operation is located in a blank space between virtual key areas of the transparent virtual keyboard.

12. The mobile terminal according to claim 10, wherein the determining that the first touch operation is invalid inputting of the transparent virtual keyboard executed by the processor further comprises:
   determining that the first touch operation is simultaneously clicking multiple touch points in the display area of the transparent virtual keyboard, wherein the number of touch points is greater than the maximum number of simultaneously clicked touch points supported by the valid inputting of the transparent virtual keyboard.

13. The mobile terminal according to claim 10, wherein the determining that the first touch operation is invalid inputting of the transparent virtual keyboard executed by the processor further comprises:
   determining that the first touch operation is a track generated through touch points within the display area of the transparent virtual keyboard, wherein the track is located outside the display area of the transparent virtual keyboard.

14. The mobile terminal according to claim 10, further comprising:
   based upon the determination that the target object of the first touch operation is a page content in the display area of the transparent virtual keyboard, the processor is configured to execute the instructions to increase transparency of the transparent virtual keyboard.

15. The mobile terminal according to claim 14, wherein the increasing transparency of the transparent virtual keyboard executed by the processor comprises:
   improving the transparency to a preset value for hiding the transparent virtual keyboard.

16. The mobile terminal according to claim 10, before the displaying the transparent virtual keyboard on the touch screen, the processor is configured to execute the instructions to:
   receive a third operation whose target object is a page, and determining that the third operation for the page is an operation of triggering inputting through the transparent virtual keyboard; and
   reduce transparency of the transparent virtual keyboard to display the transparent virtual keyboard.

* * * * *